May 27, 1947.  H. M. ISAACSON  2,421,027
DEVICE FOR REMOVING THE TARNISH FROM SILVER AND THE LIKE
Filed Oct. 25, 1943
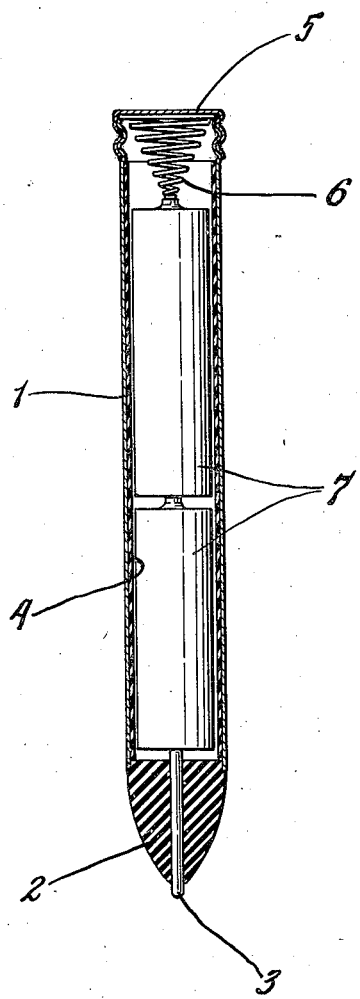
INVENTOR.
Herbert M. Isaacson
BY
Popp and Popp
Attorneys Patented May 27, 1947

2,421,027

UNITED STATES PATENT OFFICE 2,421,027

DEVICE FOR REMOVING THE TARNISH FROM SILVER AND THE LIKE

Herbert M. Isaacson, Buffalo, N. Y.

Application October 25, 1943, Serial No. 507,526

2 Claims. (Cl. 204—224)

This invention relates to an apparatus for the removing of tarnish from household metal articles, such as silverware, and is intended for household use.

One object of my invention is to provide a means for the removing of tarnish from household metal articles at a lesser expenditure of time and labor than is possible with existing conventional methods, such as the use of polishing cloths and compounds.

A second object is to provide such a means, without concomitant abrading of the articles to be cleaned.

A third object is to provide such a means in the form of an apparatus that can easily be used by the average housewife, and that is simple and cheap to build, thereby encouraging its widespread use.

The use of electrolytic methods for the cleaning of metals prior to plating is well known and widely practised in the plating industry. The apparatus used consists essentially of a vat containing a suitable electrolyte, racks from which the metal articles are suspended into the electrolyte, an electrode immersed in the electrolyte, and a direct current generator for establishing an electric current flow through the electrolyte between the articles to be cleaned and the immersed electrode.

My invention provided means, practical for household use, of applying the same electrolytic principle for the cleaning of household metal articles, particularly silverware.

The figure shows a preferred form of my invention. However, it is to be understood that variations are possible without deviating from the spirit of the invention.

In the figure, 1 is a metal housing which also serves as one electrode of the device, as explained later. 2 is an insulating member made of any waterproof electrically insulating material. It is press fitted into the end of container 1 so as to provide a water tight juncture with it. 3 is a piece of metal rod inserted in insulator 2 and extends slightly beyond each end of 2, and constitutes the other electrode of the device. It will be noted that the area of electrode 3 exposed beyond the outer end of insulator 2 is small in comparison with the area of electrode 1. 4 is an insulating lining in container 1, acting to insulate the negative terminal of battery 7 from container 1. 5 is a removable closure acting to retain the removable elements within container 1 and making electrical contact with it. 6 is a metal spring, held by closure 5, with one end contacting the positive terminal of battery 7, and with its tension pushing the negative terminal of battery 7 into contact with electrode 3. 7 is a battery which may be composed of one or more cells of standard size flashlight cells. It is inserted in container 1 so that the negative terminal contacts small area electrode 3 and the positive terminal makes electrical connection to large area electrode 1 through spring 6.

The operation of the device is as follows: The silverware or other metal articles to be cleaned are placed in any conveniently sized vessel and covered with water to which is added a sufficient quantity of salt, washing soda, or other suitable ionizing substance to make the solution electrically conductive. The device is then inserted into the solution so that the small end electrode is brought into contact with the metal article to be cleaned, and the large container-electrode has the major portion of its area in contact with the solution. Accordingly, an electric current flow will be established through the electrolyte, between the article to be cleaned and the container-electrode of the device, and the article will be cleaned of tarnish by electrolytic action after a few seconds.

By making the electrode that contacts the article to be cleaned small in area, waste of current is prevented and need for a switch dispensed with, since the current flow will be small until contact is made with the large area of the metal article being cleaned.

I claim:

1. A device for removing the tarnish from silverware and the like while immersed in an electrolytic bath, comprising a battery, an elongated tubular metal casing for said battery, an electrode projecting from one end of said metal casing, a body of insulating material interposed between said electrode and said one end of said metal casing and closing said one end of said metal casing and exposing a relatively small external area of said electrode, said metal casing having a relatively large exposed external surface to provide a second electrode, the negative terminal of said battery being connected with said first electrode and means within the casing connecting the positive terminal of said battery with said metal casing whereby upon immersing said metal casing in said bath and contacting said first electrode with said silverware a circuit is established through said silverware, electrolyte, electrodes and battery with only a small shunt current from said electrodes directly through said electrolyte.

2. A device for removing the tarnish from silverware and the like while immersed in an electrolytic bath, comprising a battery, an elongated tubular metal casing for said battery, an electrode projecting from one end of said metal casing, and a body of insulating material interposed between said electrode and said one end of said metal casing and closing said one end of said metal casing and exposing a relatively small external area of said electrode, the exposed external surface of said metal casing constituting a second electrode, the negative terminal of said battery being connected with said first electrode, and means within the casing connecting the positive terminal of said battery with said metal casing whereby upon immersing said metal casing in said bath and contacting said first electrode with said silverware a circuit is established through said silverware, electrolyte, electrodes and battery with only a small shunt current from said electrodes directly through said electrolyte.

HERBERT M. ISAACSON.

REFERENCES CITED

The following references are of record in the file of this patent:

UNITED STATES PATENTS

| Number | Name | Date |
|---|---|---|
| 490,816 | Theuerner | Jan. 31, 1893 |
| 1,892,099 | Cornell | Dec. 27, 1932 |
| 1,319,192 | Madaler | Oct. 21, 1919 |
| 1,416,929 | Bailey | May 23, 1922 |
| 1,249,597 | Clark | Dec. 11, 1917 |
| 1,159,699 | Murdock | Nov. 9, 1915 |
| 1,656,067 | Hendry | Jan. 10, 1928 |
| 1,520,297 | McKenna | Dec. 23, 1924 |
| 1,997,231 | Plutino | Apr. 9, 1935 |
| 1,875,048 | Levene | Aug. 30, 1932 |